Patented Apr. 18, 1944

2,346,994

UNITED STATES PATENT OFFICE 2,346,994

RESINLIKE PRODUCT AND METHOD OF PREPARING SAME

Robert C. Palmer and Edwin Edelstein, Pensacola, Fla., assignors to Newport Industries, Inc., Pensacola, Fla., a corporation of Delaware No Drawing. Application October 7, 1942, Serial No. 461,235

7 Claims. (Cl. 260—105)

This application is the continuation-in-part of the application, Serial No. 297,108, of Robert C. Palmer, Anthony F. Oliver, and Edwin Edelstein, filed September 29, 1939, and entitled "Resinlike product and process of making the same."

This invention relates to zinc resinates and to methods of preparing such compounds by fusion reactions.

By a "fusion reaction" we mean a reaction carried out in a fusion mass consisting principally of the reacting compounds and their reaction products, in distinction from a reaction carried out in a normally liquid solvent medium that can be recovered after the reaction is completed.

The term "resinate" is herein applied generally to include the salts of any of the resin acids, for instance, abietic, pimaric or sapinic acids or polymers or isomers thereof. Rosin containing one or more of these resin acids may be reacted as disclosed hereinbelow with a zinc compound to form the corresponding zinc-resin acid salts.

As far as we know, zinc resinates characterized by high zinc content, clarity, permanent refusibility, and capacity for forming stable, non-gelling solutions have heretofore not been prepared.

The term "permanent refusibility" as applied herein to resin-like products, means a capacity for being repeatedly fused and solidified, without any change in the characteristic appearance of the products, provided that the temperatures to which the products are subjected are kept below those temperatures at which substantial decomposition occurs.

By "stable, non-gelling solutions" we mean solutions of resin-like products in petroleum solvents and the like that do not gel when the solutions are heated to any temperatures short of their boiling points. By "gelling" we signify a thickening of a flowable solution by heating while a substantially constant concentration of solids is maintained therein, the solution finally becoming, in some cases, almost non-flowing at room temperature, and sometimes accompanied by the appearance of insoluble matter or precipitate.

By the term "clarity" as applied to our products we mean a transparency of the resinate itself due to the substantially complete absence of any unreacted zinc oxide or other zinc compound used in preparing the resin-like products to which this invention pertains. Such unreacted zinc compounds, if present, would, of course, tend to render the resin-like products obtained opaque rather than transparent. The transparency of the resinate itself is an important characteristic of our products, even though for some purposes opacifying agents may be incorporated therein.

In referring to resinates having a high zinc content, we do not mean to limit ourselves to basic or even to neutral zinc resinates but to include slightly acid zinc resinates. When the neutral, acid or basic character of a zinc oxide-rosin reaction product is referred to, the designated character of the reaction product as a whole is meant. This is done to avoid controversy over whether the zinc resinate itself may not be present in the reaction product as a basic zinc resinate even when the reaction product as a whole has an acid or neutral character.

One reason why those skilled in the art have heretofore not been able to prepare clear, permanently refusible zinc resinates having a high zinc content and capable of forming stable, non-gelling solutions, is the fact that ordinary rosin reacts only with difficulty, if at all, with zinc oxide and the like at temperatures falling below the decomposition temperature of the rosin. The reaction, even if initiated, does not go to completion but ceases long before a calculated neutrality has been effected.

The acid zinc resinates of the prior art containing relatively small amounts of combined zinc are also characterized by infusibility and by the instability of their solutions in petroleum solvents.

We have now found that the fusion reaction between rosin containing material and zinc oxide can be carried so far as to produce even basic resinates if a suitable acidic catalyst such as a low molecular weight fatty acid is incorporated with the fusion mass.

We have further found that if the rosin-containing material used as a starting material contains about 7½% of a rosin polymer, such as a dimer, the resinate products obtained are characterized by clarity, permanent refusibility, and capacity for forming stable, non-gelling solutions, in spite of the high zinc content of the resinate product obtained, which may be slightly acid, neutral or basic.

The polymer content of about 7½% indicated in the preceding paragraphs is necessarily only an approximation to the actual value of the critical polymer content. The only method available for an estimation of the polymer content of a rosin is a molecular weight determination. A molecular weight determination can serve as a basis for the calculation of the polymer content of a rosin only when the normal molecular weight of the unpolymerized rosin fraction is known. Actually, the molecular weight of the unpolymerized fraction varies according to the nature of the starting rosin-containing material used and according to the method of preparation of the rosin-containing material as well as the nature of any treatment to which the rosin-containing material may have been subjected. The given figure of 7½% represents a value arrived at by estimating the amount of polymer required upon the basis of experimental data. A series of experiments were run in which various amounts of a commercial polymerized rosin known as "Nuroz," which may contain from 25 to 40% of polymer, were blended with natural "WW" wood rosin in various proportions. The resulting blends were used as starting materials in the preparation of resinates, the stability, refusibility and clarity of which were then determined.

There is apparently a definite relationship between the permanent refusibility of the novel resin-like products of our invention and the non-gelling of the petroleum solvent solutions of these products, for gelling solutions are apparently formed only from these products which are not permanently refusible, and, conversely, all the permanently refusible solid resin-like products of our invention form stable solutions in petroleum solvents and the like without the addition of a stabilizing agent.

The novel resinates of our invention have physical properties resembling those of typical resins, being characterized, for instance, by a conchoidal fracture.

The value of our products lies not so much in their high zinc content for its drier effect, as in making available novel, high melting point synthetic resin-like products for use as substitutes for or in conjunction with known synthetic resins, such as ester gum, alkyd and phenolic resins and their modifications. Our permanently refusible resin-like products impart added properties of hardness, through drying, gloss, improved pigment dispersion and other valuable characteristics to varnish, enamels, inks and similar coatings.

It is therefore an important object of our invention to provide novel, high melting point resin-like products of a permanently refusible character and capable of forming stable non-gelling solutions in petroleum solvents, the products being clear resinates of zinc high in zinc content and being substantially free of uncombined metal and having the valuable properties of imparting hardness, through drying, improved pigment dispersion and other desirable characteristics to varnish, enamels, inks, and similar coatings.

Another important object of this invention is to provide a fusion method for the preparation of such resin-like products from rosins containing substantial proportions of rosin polymers.

Another important object of this invention is to provide a fusion method for making a substantially neutral or basic zinc resinate having permanently refusible characteristics and capable of forming stable, non-gelling solutions in petroleum solvents.

Other and further important objects of this invention will become apparent from the following description and appended claims.

The starting material for our process may be a partially polymerized pine oleoresin, gum rosin, or wood rosin, or a product on this order that has also been subsequently heat treated or hydrogenated.

Partial polymerization may be effected by means of a catalyst in accordance with the methods of such patents as those to Schnorf, No. 2,074,192, to Rummelsburg, Nos. 2,108,928 and 2,124,675, and to Morton, No. 2,017,866, or preferably in accordance with the method described and claimed in the Palmer and Bibb Patent No. 2,247,399, filed September 28, 1938, and granted July 1, 1941. Since the products so obtained are generally referred to as polymerized rosins, that term will be used herein to designate rosins produced by the action of a polymerization catalyst and containing a substantial proportion of polymers of a resin acid.

It is possible to select from the patented chemical processes referred to in the preceding paragraph a method that will produce rosin containing almost any desired amount of polymers up to and including a substantially complete rosin dimer content. The amount of dimer, for instance, in the preferred example of the Palmer and Bibb Patent No. 2,247,399, having a capillary tube melting point of 75° to 80° C. may vary from 25 to 40%. A resin containing such a percentage of polymers is generally preferred for our process, since the amount of polymers necessary to give the desired product is thereby assured.

We can also successfully use natural gum and wood rosin to which has been added a sufficient proportion of polymerized rosin, such as the product of the preferred example of the Palmer and Bibb Patent No. 2,247,399, sold commercially as "Nuroz." The following experiment is indicative of the effect of the rosin polymer content upon the non-gelling characteristics of the resulting resinate when dissolved in a petroleum solvent or the like. A blend was prepared of one part by weight of "Nuroz" with three parts by weight of natural "WW" wood rosin and then reacted with 7% of zinc oxide, based on the total weight of the rosin (wood rosin plus "Nuroz"). A 60% solution of the resulting zinc resinate in a petroleum solvent gelled when heated at 150° C. for two hours. A similar blend consisting of one part "Nuroz" and two parts of "WW" wood rosin was also reacted with the same proportionate amount of zinc oxide. The resulting zinc resinate, when dissolved to 60% concentration in mineral spirits, did not gel under the same treatment. Apparently a minimum proportion of polymer in the starting rosin equivalent to about 7.5% by weight of rosin dimer (formed therein by treating rosin with a polymerization catalyst or by adding that proportion of dimer to pine oleoresin or natural gum or wood rosin) is necessary to assure the formation of a permanently refusible zinc resinate capable of forming a stable, non-gelling solution.

Throughout this specification and in the claims, where percentages are referred to, percentages by weight are intended unless otherwise specified. In the case of reacting proportions of zinc oxide, the percentages expressed in the claims are based on the weight of the rosin acid-containing material. The percentages assume such rosin acid-containing material to have an acid value of about 150 to 160. The rosins that we prefer to use have acid values of that order of magnitude, but if the rosin acid-containing material to be used were found to have a considerably lower or higher acid value, the percentages of zinc oxide would be proportionately lower or higher than the percentages herein specified.

In accordance with our method any rosin containing at least about 7.5% of rosin dimer or other polymer is fused with zinc oxide or zinc hydroxide or zinc carbonate, preferably at from 200° to 300° C. A catalyst is added to the reaction mass, acetic acid being preferred. Other catalysts enumerated in the Romaine et al. Patent No. 1,884,407 may be employed, however, especially catalysts selected from the group consisting of organic acids soluble in rosin at the reaction temperature whose acidity is due to a carboxylic acid radical, organic acids soluble in rosin at the reaction temperature whose acidity is of a phenolic nature, and salts of said acids capable of reacting with abietic acid to liberate said acids, such as formic acid, lactic acid, tartaric acid, citric acid, or a metal salt (including the ammonium salts) of these and other carboxylic acids, in particular, the fatty acids of low molecular weight.

Since a catalyst must be present at all stages of the fusion in order to have the reaction go to completion, it is essential to avoid the loss or destruction of the catalyst during the fusion process if substantially all of the zinc compound is to be combined with the rosin, and if a clear resinate product is to be produced.

Several methods are available for avoiding the loss or destruction of the catalyst. Thus, if the reaction temperature is maintained, for example, at about 240° C. or above, the catalyst may be added with the zinc compound. If acetic acid is used, the acid will react with the zinc compound to form the corresponding acetate which is not volatile at the reaction temperature but may decompose gradually. To prevent the formation of lumps of acetate and to aid in the fusion reaction, the mixture of zinc oxide and acetate may be wetted with barely enough liquid to form a slurry. An oil, such as a petroleum solvent, may be used that will volatilize during the fusion process. When such an oil is employed with the metal compounds, the quantity of oil employed is in no case sufficient to effect a reaction in solution rather than a fusion reaction. Water may also be used to form the slurry.

The amount of catalyst required to give a clear resin will obviously depend upon the manner in which the fusion reaction is conducted and upon the particular means adapted to insure the presence of a catalyst during the entire reaction, but from ½ part to about 1 part by weight for each 100 parts of rosin is usually sufficient.

The amount of zinc oxide to be added will depend upon the acid value of the rosin employed and also upon whether an acid, neutral or basic zinc oxide-rosin reaction product is desired. Assuming that the rosin has an acid value of 160, 11.55% of zinc oxide (ZnO) by weight of the rosin will be required theoretically to give a neutral, or normal zinc oxide-rosin reaction product.

Accordingly, if a substantially neutral zinc oxide-rosin reaction product is desired, about 11 parts by weight of zinc oxide should be added. If a basic zinc oxide-rosin reaction product is desired, more than 11.55% of zinc oxide, by weight of rosin, should be added. Where more than 12% of zinc oxide is to be reacted, a larger percentage of catalyst may be necessary. 13% of zinc oxide gives a clear zinc oxide-rosin product having a basicity equivalent to 16 acid value. When the resin-like products of our invention are prepared as herein described with not more than 13% zinc oxide, they are perfectly clear because free from any substantial amount of unreacted zinc oxide. This is not true, to the best of our knowledge, of prior art products that contain as much as 5% of zinc oxide or its equivalent.

On the basis of substantially complete reaction, the reaction products of rosin and 5, 6, 12 and 13% of zinc oxide would contain about 3.8%, 4.6%, 8.8% and 9.5%, respectively, of combined zinc.

The following will serve as an example of carrying out the fusion process of the present invention. The starting material may be a polymerized rosin prepared by subjecting an anhydrous solution of wood rosin (color grade WW) in a petroleum solvent (boiling between 105° and 140° C.) to the action of about 1½% of zinc chloride by weight of the rosin at a temperature of about 128° to 138° C. for 12 to 16 hours.

After washing to remove zinc compounds, the polymerized rosin, recovered by steaming off the solvent at about 210° to 220° C., will generally be found to have the following properties:

| | |
|---|---|
| Color | WG |
| Melting point°C | 75 to 80 |
| Acid value | 164 to 167 |
| Rotation | −4 to −8 |
| Ash per cent | Less than 0.01 |

100 parts of the partially polymerized rosin are melted in a fusion kettle and about ⅓ part to 1 part by weight of acetic acid added. Between 5 and 13% by weight of zinc oxide are added to the molten rosin with stirring and the temperature increased to between 200 and 300° C. Heating is continued until the reaction is complete, as indicated by the melt becoming clear. The resulting resin-like product is a straight zinc resinate that is substantially free from unreacted zinc oxide or hydroxide and therefore clear. This straight zinc resinate product can be dissolved in a petroleum solvent up to a 60% concentration without danger of gelling upon continued heating.

It will, of course, be understood that various details of the process may be varied through a wide range without departing from the principles of this invention and it is, therefore, not the purpose to limit the patent granted hereon otherwise than necessitated by the scope of the appended claims. The term "rosin" is used generically in these claims to include pine oleoresin.

We claim as our invention:

1. A method of preparing a zinc resinate in the form of a high melting point, permanently refusible product capable of forming a stable, non-gelling solution comprising reacting by fusion a rosin containing at least about 7.5% rosin polymer with a zinc compound selected from the group consisting of the oxide, hydroxide and carbonate, said reaction being carried out in the presence of a catalyst selected from the group consisting of the organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

2. A method of preparing a zinc resinate in the form of a high melting point, permanently refusible product capable of forming a stable, non-gelling solution comprising reacting by fusion a rosin containing at least about 7.5% rosin polymer with zinc oxide in an amount ranging from 5 to 13% by weight of the rosin, said reaction being carried out in the presence of a catalyst selected from the group consisting of the organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

3. A method of preparing a zinc resinate in the form of a high melting point, permanently refusible product capable of forming a stable, non-gelling solution comprising reacting by fusion a rosin containing at least about 7½% rosin polymer with zinc oxide in an amount ranging from 5 to 13% by weight of the rosin, said reaction being carried out in the presence of an amount of acetic acid equal to about ⅓% to 1% by weight of the rosin.

4. A method of preparing a zinc resinate in the form of a high melting point, permanently refusible product capable of forming a stable, non-gelling solution comprising reacting by fusion at from 200° to 300° C. a rosin containing at least about 7.5% rosin polymer with zinc oxide in an amount ranging from 5 to 13% by weight of the rosin, said reaction being carried out in the presence of a catalyst selected from the group consisting of the organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids, and said fusion being continued until the melt is clear.

5. A method of preparing a zinc resinate in the form of a high melting point, permanently refusible product capable of forming a stable, non-gelling solution comprising reacting by fusion at from 200° to 300° C. a rosin containing at least about 7.5% rosin polymer with zinc oxide in an amount ranging from 5 to 13% by weight of the rosin, said reaction being carried out in the presence of an acetic acid catalyst.

6. A fusion produced, permanently refusible zinc resinate capable of being dissolved in a petroleum solvent only up to 60% concentration to form a stable, non-gelling solution and containing from 3.8 to 9.5% of combined zinc.

7. A fusion produced, permanently refusible zinc resinate capable of being dissolved in a petroleum solvent only up to 60% concentration to form a stable, non-gelling solution and containing at least from 3.8 to 9.5% of combined zinc together with at least about 7.5% by weight of the rosin content of a rosin polymer.

ROBERT C. PALMER.
EDWIN EDELSTEIN.